United States Patent [19]

Roper et al.

[11] Patent Number: 5,221,491
[45] Date of Patent: Jun. 22, 1993

[54] TWO-CYCLE OIL ADDITIVE

[75] Inventors: Renee M. Roper, Manalapan, N.J.; George M. Tiffany, III, Houston, Tex.; William H. Stover; William R. Thompson, both of Sarnia, Canada

[73] Assignee: Exxon Chemical Patents Inc., Linden, N.J.

[21] Appl. No.: 742,955

[22] Filed: Aug. 9, 1991

[51] Int. Cl.$^5$ .................................. C10M 133/56
[52] U.S. Cl. ........................ 252/51.5 A; 252/56 R; 252/56 D; 548/546; 548/547
[58] Field of Search ............... 252/51.5 A; 548/546, 548/547

[56] References Cited

U.S. PATENT DOCUMENTS

| | | | |
|---|---|---|---|
| 2,278,445 | 4/1942 | Hull | 196/10 |
| 2,301,052 | 11/1942 | Kirn et al. | 196/10 |
| 2,318,719 | 5/1943 | Schneider et al. | 196/10 |
| 2,329,714 | 9/1943 | Grasshof | 196/10 |
| 2,345,574 | 4/1944 | Burk | 260/683.15 |
| 2,422,443 | 6/1947 | Smith | 196/78 |
| 2,568,876 | 9/1951 | White et al. | 106/14 |
| 3,087,936 | 4/1963 | Le Suer | 260/326.3 |
| 3,110,673 | 11/1963 | Benoit, Jr. | 252/51.5 |
| 3,163,603 | 12/1964 | Le Suer | 252/33.6 |
| 3,172,892 | 3/1965 | Le Suer et al. | 260/326.5 |
| 3,216,936 | 11/1965 | Le Suer | 252/32.7 |
| 3,219,666 | 11/1965 | Norman et al. | 260/268 |
| 3,223,625 | 12/1965 | Cyphers et al. | 252/51.5 A |
| 3,272,746 | 9/1966 | Le Suer et al. | 252/47.5 |
| 3,306,907 | 2/1967 | McNinch et al. | 260/326.3 |
| 3,340,281 | 9/1967 | Brannen, Jr. et al. | 260/404.5 |
| 3,346,354 | 10/1967 | Kautsky et al. | 44/63 |
| 3,630,902 | 12/1971 | Coupland et al. | 252/51.5 A |
| 4,200,545 | 4/1980 | Clason et al. | 252/33.4 |
| 4,234,435 | 11/1980 | Meinhardt et al. | 252/51.5 A |
| 4,482,464 | 11/1984 | Karol et al. | 252/51.5 A |
| 4,663,063 | 5/1987 | Davis | 252/51.5 R |
| 4,705,643 | 11/1987 | Nemo | 252/51.5 A |
| 4,708,809 | 11/1987 | Davis | 252/33.4 |
| 4,780,111 | 10/1988 | Dorer et al. | 44/71 |

OTHER PUBLICATIONS

"Ethylene Amines" in Encyclopedia of Chemical Technology Kirk and Othmer, vol. 5, pp. 898-905. Interscience Publishers, New York (1950).

Primary Examiner—Ellen McAvoy
Attorney, Agent, or Firm—V. T. White

[57] ABSTRACT

The invention relates to a two-cycle oil additive, compositions and concentrates containing said two-cycle oil additive and methods of preparing and using the two-cycle oil additive which comprises the reaction product of (A) at least one high molecular weight acylating agent (B) at least one polyalkylenpolyamine and (C) at least one monocarboxylic second acylating agent, wherein the molar ratio of the carboxylic acid acylating agent to the high molecular weight acylating agent is at least 3:1 and wherein the tertiary amine to total amine ratio of the reaction product is at least 0.7:1. The two-cycle oil additive of the invention are dispersant additives which will improve engine cleanliness and which will substantially avoid the formation of insoluble gel agglomerants at low temperatures which can adversely affect engine performance.

38 Claims, No Drawings

TWO-CYCLE OIL ADDITIVE

BACKGROUND OF THE INVENTION

The invention relates to an additive for two-cycle oils; compositions and concentrates containing said additive and a method of preparing and using the two-cycle oil additive. The additive, when incorporated into two-cycle oils, produces a dispersant additive composition which will provide satisfactory engine cleanliness and which will render the oil stable after being subjected to low temperatures by substantially delaying or avoiding the formation of gelled agglomerates which in previous prior art products have become a concern with respect to engine performance.

Two-cycle (two-stroke) internal combustion engines, including rotary engines are found in power lawn mowers and other power-operated gardening equipment, power chain saws, pumps, electrical generators, marine outboard engines, snowmobiles, motorcycles, and the like. Two-cycle engines employed as such are operated by mixing the fuel and the two-cycle oil in prescribed proportions. The two-cycle oil additive of the instant invention is designed for use in most types of two-cycle engines and particularly in marine outboard engines.

Two-cycle engines are lubricated by mixing the lubricant with the fuel for the engine. The mixture of fuel and lubricant passes through the crankcase of a two-cycle engine, where it lubricates the moving parts of the engine, and then flows through intake ports into the combustion chamber of the engine where the mixture of the fuel and lubricant is burned. The combustion products are vented from the combustion chambers through exhausts ports. As a consequence, a satisfactory lubricant for a two-cycle engine must not only provide adequate lubrication for moving engines parts but also must be able to pass into the combustion chamber leaving no objectional deposits in the intake ports; must burn cleanly to avoid fouling the combustion chamber and spark plug with undesirable deposits; control varnish and sludge formation which leads to ring sticking and in turn to failure of the sealing function of piston rings; and must not result in plugging of the exhaust ports.

The increasing severity of the conditions under which two-cycle engines operate, has led to increasing demands for oils to adequately lubricate such engines. Alleviation of the problems has been through the provision of more effective additives for two-cycle engine oils and oil fuel combinations.

It is known to use acylated nitrogen-containing compounds as dispersant in two-cycle oil lubricants to prevent the deposition of solid materials on engine surfaces in contact with the lubricating composition. Such acylated nitrogen-containing compounds, as for instance the reaction product of isostearic acid and a polyamine, are disclosed in U.S. Pat. No. 3,110,673 and 4,705,643. These products are, however, susceptible to forming gel like agglomerates called "fish-eyes", when subjected to low temperatures as in storage. The matrix for the gels are thought to be compounds formed during synthesis. The gel can be observed by inverting a glass vial of dispersant in oil and watching for the globules or agglomerates which adhere to the glass surface. Once formed, the gel is stable at room temperature and can cause blocking of the filters of the two-cycle engines in addition to rendering the oil lumpy and aesthetically displeasing for marketing purposes.

U.S. Pat. No. 3,110,673 mentioned above discloses a lubricant composition containing a pour point depressant and ashless dispersant. The ashless dispersant is described as the reaction product of a polyalkylene amine and a mixed, branched and straight chain acid.

U.S. Pat. No. 4,705,643 also mentioned above described an ashless lubricating two-cycle oil-additive comprised of the condensation reaction of a branched isostearic acid and tetraethylene pentamine.

U.S. Pat. No. 2,568,876 discloses the use of organic nitrogen compounds as corrosion inhibiting compositions. The organic nitrogen compound disclosed are reaction products of monocarboxylic acids, polyalkylene polyamines having one more nitrogen atom per molecule than there are alkylene groups in the molecule and reacting this product with an alkenyl succinic acid anhydride. The ratio of alkenyl succinic acid to monocarboxylic acid disclosed is 1:1 to 4:1 and the alkenyl radical carbon range disclosed preferably range from 8 to 18.

U.S. Pat. No. 3,216,936 discloses nitrogen-containing compositions derived from the acylation of alkylene amines and is used to stabilize metal phosphorodithioates antioxidant additives in lubricating compositions. The acylated amines of the patent are prepared by heating together an alkylene amine with an acidic mixture consisting of a hydrocarbon-substituted succinic acid and an aliphatic monocarboxylic acid. The equivalent amount of succinic acid to monocarboxylic acid disclosed range from 1:0.1 to about 1:1.

U.S. Pat. Nos. 4,200,545; 4,708,809; 4,663,063; 4,708,809 and 4,780,111 all disclosed products derived from reacting first and second acylating agents comprising carboxylic acids or anhydrides with polyamines wherein the range of equivalence for the succinic acid agent to monocarboxylic acid ranges from 1:1 to 10:1.

The present invention is directed to an additive for two-cycle lubricating oils especially two-cycle oil additives for outboard engines and particularly water-cooled outboard engines. The invention is further directed to an additive which is stable at low temperatures and which also provides good detergency, lubricity, antiwear and corrosion inhibition.

It is therefore an object of the invention to provide a low temperature stable two-cycle oil additive which will not form gels at low temperatures and which provide satisfactory engine cleanliness.

SUMMARY OF THE INVENTION

A two-cycle oil dispersant additive has been discovered which substantially avoids the formation of gelled agglomerates at low temperatures but which correspondingly provides effective engine cleanliness, detergency, lubricity and wear inhibition. It has been discovered that a two-cycle oil additive comprising a nitrogen-containing compound prepared by reacting (A) at least one high molecular weight substituted carboxylic acid acylating agent with (B) at least one polyalkylene polyamine and (C) at least one monocarboxylic acid wherein the molar ratio of the monocarboxylic acid to high molecular weight substituted acylating agent is at least 3:1. The additive of the invention comprise molecules containing oil soluble hydrocarbon moiety(ies) connected to polar moieties which are substantially comprised of tertiary amines, preferably imidazoline heterocycles, and wherein the ratio of tertiary amine to total amine is at least about 0.7:1. The additive remains stable to the formation of the gelled agglomerants, especially during prolong storage at low temperatures (0° C. or less).

The invention further comprises a method for preparing the storage stable 2-cycle oil additive which method comprises the reaction of (A) at least one high molecular weight substituted carboxylic acid acylating agent, (B) at least one polyalkylenepolyamine and (C) at least one monocarboxylic acid acylating agent wherein the acid acylating agents are added to the amine in a "reverse addition" mode i.e. acylating agents to amine. In a modification of the reverse addition mode, a portion of the carboxylic acid acylating agent or the acid acylating agents are initially added to the reactor. The polyamine is then added and the remaining acylating agents are charged in any order or as a mixture. The process further comprises conducting the reaction under conditions necessary to maximize tertiary amine. The ratio of the carboxylic acid acylating agent to the high molecular weight acid reactant for the process is at least 3:1 and the product is prepared under conditions favorable to forming tertiary amines, preferably in the form of imidazoline units, so that the ratio of tertiary amines to total amines is at least about 0.7:1. In particular, the use of such two-cycle additives avoids or reduces the formation of gel (or flock-possible gel precursors) at low temperature in addition to providing dispersancy which prevents the buildup of harmful deposits which reduce engine performance in two-cycle engines.

DETAILED DESCRIPTION OF THE INVENTION

Broadly stated, the invention is directed to a two-cycle oil lubricating oil additive and compositions and concentrates containing the two-cycle oil additives and to processes for preparing and using said two-cycle oil additives.

The two-cycle oil additives of the invention comprise reaction products of (A) at least one high molecular weight mono or polycarboxylic acid type acylating agent (B) at least a polyalkylenepolyamine and (C) at least one monocarboxylic acid second acylating agent and wherein the ratio of the second acylating agent to high molecular weight acylating agent is at least 3:1, preferably from 5:1 to 59:1 and most desirably 5:1 to 12:1 and wherein the ratio of tertiary amine to total amine is at least about 0.7:1, preferably at least 0.85:1. Throughout this specification and claims, any reference to carboxylic acids as acylating agent is intended to include the acid-producing derivatives such as anhydrides, esters, acyl halides, and mixtures thereof unless otherwise specifically stated.

The two-cycle engine oil compositions of the invention comprise a major amount of an oil of lubricating viscosity. Typically this viscosity is in the range of about 20 to about 50 cst at 40° C.

These oils of lubricating viscosity can be natural or synthetic oils. Mixtures of such oils are also often useful.

Natural oils include mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful base oils.

Synthetic lubricating oils include hydrocarbon oils such as polymerized and interpolymerized olefins (e.g., polybutylenes, polypropylenes, propylene-isobutylene copolymers, etc.); poly(1-hexenes), poly(1-octenes), poly(1-docenes), etc., and mixtures thereof; alkylbenzenes (e.g., dodecylbenzenes, tetradecylbenzenes, dinonylbenzenes, di-(2-ethylhexyl-)benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Oils made by polymerizing olefins of less than 5 carbon atoms, such as ethylene, propylene, butylenes, isobutene, pentene, and mixtures thereof are typical synthetic polymer oils. Methods of preparing such polymer oils are well known to those skilled in the art as is shown by U.S. Pat. Nos. 2,278,445; 2,301,052; 2,318,719; 2,329,714; 2,345,574; and 2,422,443.

Alkylene oxide polymers (i.e., homopolymers, interpolymers, and derivatives thereof where the terminal hydroxyl groups have been modified by esterification, etherification, etc.) constitute a preferred class of known synthetic lubricating oils for the purpose of this invention, especially for use in combination with alkanol fuels. They are exemplified by the oils prepared through polymerization of ethylene oxide or propylene oxide, the alkyl and aryl ethers of these polyoxyalkylene polymers (e.g., methyl polypropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters mixed $C_3$–$C_8$ fatty acid esters, or the $C_{13}$ Oxo acid diester of tetraethylene glycol.

Another suitable class of synthetic lubricating oils comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, octyl alcohol, dodecyl alcohol, tridecyl alcohol, 2-ethylhexyl alcohol, ethylene glycol, diethylene glycol monoether, propylene glycol, etc.). Specific examples of these esters include dioctyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{18}$ monocarboxylic acids and polyols and polyol ethers such as neopentyl glycol, trimethylol propane, pentaerythritol, dipentaeryth-ritol, tripentaerythritol, etc.

Unrefined, refined and rerefined oils, either natural or synthetic (as well as mixtures of two or more of any of these) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from primary distillation or an ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, secondary distillation, acid or base extraction, filtration, percolation, etc. Rerefined oils are obtained by processes similar to those used to obtain refined oils which have been already used in service. Such rerefined oils are also known as reclaimed or reprocessed oils and often are additionally processed by techniques directed to removal of spent additives and oil breakdown products.

A—The High Molecular Weight Acylating agent

The high molecular weight acylating agent may be comprised of at least one aliphatic or aromatic mono or dicarboxylic acid. High molecular weight as used herein defines the substituted acylating agent comprising molecular weights ($\overline{Mn}$) which range from 700 to 4000 and preferably from 900 to 2500. The polymer molecular weight distribution (Mw/Mn) generally is less than 4.5:1, preferably less than 3:1 and more preferably 1.5:1 to 3:1. As previously indicated throughout this specification and claims, any reference to carboxylic acids as acylating agent is intended to include the acid-producing derivatives such as anhydrides, esters, acyl halides, and mixtures thereof unless otherwise specifically stated.

The aliphatic polycarboxylic acids useful in preparing the high molecular weight acylating agent are maleic acid, maleic anhydride, chloromaleic anhydride, malonic acid, succinic acid, succinic anhydride, glutaric acid, glutaric anhydride, adipic acid, pimelic acid, azelaic acid, sebacic acid, glutaconic acid, citraconic acid, itaconic acid, allyl succinic acid, cetyl malonic acid, tetrapropylene-substituted succinic anhydride, etc., and derivatives thereof.

The acylating agent may contain polar substituents provided that the polar substituents are not present in portions sufficiently large to alter significantly the hydrocarbon character of the acylating agent exclusive of the carboxyl groups or cause excessive rusting when the finished additive is used in two-cycle oil. Typical suitable polar substituents include halo, such as chloro and bromo, oxo, oxy, formyl, sulfenyl, sulfinyl, thio, nitro, etc. Such polar substituents, if present, preferably do not exceed 10 percent by weight of the total weight of the hydrocarbon portion of the acylating agent.

Carboxylic acylating agents used to prepare the high molecular weight acylating agents are well known in the art and have been described in detail, for example, in U.S. Pat. Nos. 3,087,936; 3,163,603; 3,172,892; 3,219,666; 3,272,746; 3,306,907; 3,346,354; and 4,234,435. In the interest of brevity, these patents are incorporated herein for their disclosure of suitable mono- and polycarboxylic acid acylating agents which can be used as starting materials in the present invention.

As disclosed in the foregoing patents, there are several processes for preparing the high molecular weight acids used in this invention. Generally, the process involves the reaction of (1) an ethylenically unsaturated carboxylic acid, acid halide, or anhydride with (2) an ethylenically unsaturated hydrocarbon containing at least about 40 aliphatic carbon atoms. The ethylenically unsaturated hydrocarbon reactant can, of course, contain polar substituents, other oil-solubilizing pendant groups, and be unsaturated within the general limitations explained hereinabove. It is these hydrocarbon reactants which frequently, but not always, provide most of the aliphatic carbon atoms present in the acyl moieties of the final products.

When preparing the high molecular weight carboxylic acid acylating agent, the carboxylic acid reactant usually corresponds to the formula $R_o\text{—}(\text{—COOH})_n$, where $R_o$ can be alkyl but more frequently is characterized by the presence of at least one ethylenically unsaturated carbon-to-carbon covalent bond and n is an integer from 1 to 6 and preferably 1 or 2. The acidic reactant can also be the corresponding carboxylic acid halide, anhydride, ester, or other equivalent acylating agent and mixtures of one or more of these. Ordinarily, the total number of carbon atoms in the acidic reactant will not exceed 10 and generally will not exceed 4. Preferably the acidic reactant will have at least one ethylenic linkage in an alpha, beta-position with respect to at least one carboxyl function. Exemplary acidic reactants are acrylic acid, methacrylic acid, maleic acid, maleic anhydride, succinic and succinic anhydride, fumaric acid, itaconic acid, itaconic anhydride, citraconic acid, citraconic anhydride, mesaconic acid, glutaconic acid, aconitic acid, crotonic acid, methylcrotonic acid, sorbic acid, 3-hexenoic acid, 10-decenoic acid, and the like.

As is apparent from the foregoing discussion, the high molecular weight carboxylic acid acylating agents may contain cyclic and/or aromatic groups. However, the acids are essentially aliphatic in nature and in most instances, the preferred high molecular weight acid acylating agents are aliphatically substituted succinic acid or anhydride.

The aliphatic hydrocarbon-substituted succinic acid and anhydrides are especially preferred as acylating agents used as starting materials in the present invention. These succinic acid acylating agents are readily prepared by reacting maleic anhydride with a high molecular weight olefin or a chlorinated hydrocarbon such as a chlorinated polyolefin. The reaction involves merely heating the two reactants at a temperature of about 100°–300°, preferably, 100°–200° C. The product from such a reaction is a substituted succinic anhydride where the substituent is derived from the olefin or chlorinated hydrocarbon as described in the above-cited patents. The product may be hydrogenated to remove all or a portion of any ethylenically unsaturated covalent linkages by standard hydrogenation procedures, if desired. The substituted succinic anhydrides may be hydrolyzed by treatment with water or steam to the corresponding acid and either the anhydride or the acid may be converted to the corresponding acid halide or ester by reacting with phosphorus halide, phenols, or alcohols.

The ethylenically unsaturated hydrocarbon reactant and the chlorinated hydrocarbon reactant used in the preparation of the high molecular weight acylating agents are principally the high molecular weight, substantially saturated petroleum fractions and substantially saturated olefin polymers. The polymers that are derived from mono-olefins having from 2 to about 30 carbon atoms are preferred. The especially useful polymers are the polymers of 1-mono-olefins such as ethylene, propene, 1-butene, isobutene, 1-hexene, 1-octane, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

The interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with p-methyl-styrene, 1-hexene with 1,3-hexadiene, 1-octene with 1-hexene, 1-heptane with 1-pentene, 3-methyl-1-butene with 1-octene, 3,3-dimethyl-1-pentene with 1-hexene, isobutene with styrene and piperylene, etc.

For reasons of hydrocarbon solubility, and stability the interpolymers contemplated for use in preparing the high molecular weight acylating agents of this invention should be substantially aliphatic and substantially saturated, that is, they should contain at least about 80 percent and preferably about 95 percent, on a weight basis, of units derived from aliphatic mono-olefins. Preferably, they will contain no more than about 5 percent olefinic linkages based on the total number of the carbon-to-carbon covalent linkages present.

The chlorinated hydrocarbons and ethylenically unsaturated hydrocarbons used in the preparation of the acylating agents can have molecular weight ($\overline{Mn}$) of up to about 4000 or even higher. The preferred reactants are the above-described polyolefins and chlorinated polyolefins containing an average of at least 40 carbon atoms, preferably at least 60.

The high molecular weight acylating agents may also be prepared by halogenating a high molecular weight hydrocarbon such as the above-described olefin polymers to produce a polyhalogenated product, converting the polyhalogenated product to a polynitrile, and then hydrolyzing the polynitrile. They may be prepared by oxidation of a high molecular weight polydric alcohol with potassium permanganate, nitric acid, or a similar oxidizing agent. Another method for preparing such polycarboxylic acids involves the reaction of an olefin or a polar-substituted hydrocarbon with an unsaturated polycarboxylic acid such as 2-pentene-1,3,5-tricarboxylic acid prepared by dehydration of citric acid.

High molecular weight monocarboxylic acid acylating agents may be obtained by oxidizing a monoalcohol with potassium permanganate or by reacting a halogenated high molecular weight olefin polymer with a ketene. Another convenient method for preparing monocarboxylic acid involves the reaction of metallic sodium with an acetoacetic ester or a malonic ester of an alkanol to form a sodium derivative of the ester and the subsequent reaction of the sodium derivative with a halogenated high molecular weight hydrocarbon such as brominated wax or brominated polyisobutene.

High molecular weight monocarboxylic and polycarboxylic acid acylating agents can also be obtained by reacting chlorinated mono- and polycarboxylic acids, anhydrides, acyl halides, and the like with ethylenically unsaturated hydrocarbons or ethylenically unsaturated substituted hydrocarbons such as the polyolefins and substituted polyolefins described hereinbefore in the manner described in U.S. Pat. No. 3,340,281.

The high molecular weight monocarboxylic and polycarboxylic acid anhydrides are obtained by dehydrating the corresponding acids. Dehydration is readily accomplished by heating the acid to a temperature above about 70° C., preferably in the presence of a dehydration agent, e.g., acetic anhydride. Cyclic anhydrides are usually obtained from polycarboxylic acids having acid radicals separated by no more than three carbon atoms such as substituted succinic or glutaric acid, whereas linear anhydrides are obtained from polycarboxylic acids having the acid radicals separated by four or more carbon atoms.

The acid halides of the monocarboxylic and polycarboxylic acids can be prepared by the reaction of the acids or their anhydrides with a halogenating agent such as phosphorus tribromide, phosphorus pentachloride, or thionyl chloride.

Although it is preferred that the high molecular weight acylating agent is an aliphatic mono-or polycarboxylic acid, and more preferably a dicarboxylic acid, the substituted carboxylic acylating agent also may be prepared from aromatic mono- or polycarboxylic acid or acid-producing compound. The aromatic acids are principally mono- and dicarboxy-substituted benzene, naphthalene, anthracene, phenanthrene or like aromatic hydrocarbons. The substituted alkyl groups may contain up to about 300 carbon atoms. The aromatic acid may also contain other substituents such as hydroxy, lower alkoxy, etc. Specific examples of aromatic mono- and polycarboxylic acids and acid-producing compounds useful in preparing the high molecular weight acylating agent include benzoic acid, m-toluic acid, salicyclic acid, phthalic acid, isophthalic acid, terephthalic acid, 4-propoxy-benzoic acid, 4-methyl-benzene-1,3-dicarboxylic acid, naphthalene-1,4-dicarboxylic acid, anthracene dicarboxylic acid, 3-dodecyl-benzene-1,4-dicarboxylic acid, 2,5-dibutylbenzene-1,4-dicarboxylic acid, etc. The anhydrides of thee dicarboxylic acids also are useful as the substituted carboxylic acylating agent.

B—Polyalkylenepolyamines

The polyalkene polyamines useful as a reactant may be generally characterized by the formula

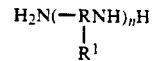

wherein R is a $C_2$ or $C_3$ alkylene radical or mixtures thereof; $R^1$ is H or an alkyl radical of from about 1 to about 16 carbon atoms and n is an integer greater than one.

Preferably, n is an integer less than about 6, and the alkylene group R is ethylene or propylene. Non-limiting examples of the polyalkylenepolyamine reactants are diethylenetriamine; triethylenetetramine; tetraethylenepentamine; di-(methylethylene)triamine; hexapropyleneheptamine; tri-(ethylethylene) tetramine; dipropylenetriamine; penta-(1-methylpropylene)-hexamine; hexa-(1,1-dimethyl-ethylene)-heptamine; tri-(1,2,2-trimethylethylene) tetramine; triamine; tetra-(1,3-dimethylpropylene) pentamine; penta (1,2-dimethyl-1-isopropylethylene) hexamine; penta (1-methyl-2-benzylethylene) hexamine; tetra-(1-methyl-3-benzylpropylene) pentamine; tri-(1-methyl-1-phenyl-3-propylpropylene) tetramine; and tetra-(1-ethyl-2-benzylethylene) pentamine. The ethylene amines are especially useful. They are discussed in some detail under the heading "Ethylene Amines" in "Encyclopedia of Chemical Technology" Kirk and Othmer, Vol. 5, pages 898-905. Interscience Publishers, New York (1950). Such compounds are prepared most conveniently by the reaction of alkylene dihalide, e.g., ethylene dichloride, with ammonia or primary amines. This reaction results in the production of somewhat complex mixtures of alkylene amines including cyclic condensation products such as piperazine and N-alkyl substituted piperazines. These mixtures find use in the process of this invention.

C—Second Acylating Agent

The carboxylic acid second acylating agent utilized in the preparation of the two-cycle oil additive of the present invention may preferably be any monocarboxylic acid having at least 2 carbon atoms and generally less than 40, or aromatic monocarboxylic acids or acid-producing compounds. Generally, the monocarboxylic acid suitable for use as the second carboxylic acid acylating agent will have a carbon range from 8 to 40 preferably from 10 to 30.

The aromatic and the heterocyclic monocarboxylic acids, as well as the aliphatic monocarboxylic acids, are utilizable. Monocarboxylic acids containing substituent groups, are also applicable herein so long as they do not contribute to engines rusting or gel formation in finished oils. However, the preferred monocarboxylic acids reactants are the aliphatic monocarboxylic acids, i.e., the branched-chain saturated or branched or straight chain unsaturated monocarboxylic acids, and the acid halides and acid anhydrides thereof. Mixtures of branced and straight chain acids can also be used so long as the straightchain acid content is limited so as to not cause gel or sediment in finished oil, normally to less than 10% of the mixture. Particularly preferred are the aliphatic monocarboxylic acid reactants having a relatively long carbon chain length, such as a carbon chain length of between about 10 carbon atoms and about 30 carbon atoms. Non-limiting examples of the monocarboxylic acid reactant; acetic acid; acetic anhydride; acetyl fluoride; acetyl chloride; propionic acid; propiolic acid; propionic acid anhydride; propionyl bromide; butyric acid anhydride; isobutyric acid; crotonic acid chloride; crotonic acid anhydride; isocrotonic acid; $\beta$-ethylacrylic acid; valeric acid; acrylic acid anhydride; allyacetic acid; hexanoic acid; hexanoyl chloride; caproic acid anhydride; sorbic acid; nitrosobutyric acid; aminovaleric acid; aminohexanic acid; heptanoic acid; heptanoic acid anhydride; 2-ethylhexanoic acid; decanoic acid; dodecanoic acid; undecylenic acid; oleic acid; heptadecanoic acid;stearic acid; isostearic acid; linoleic acid; linolenic acid; phenylstearic acid; xylylstearic acid; $\alpha$-dodecyltetradecanoic acid; behenolic acid; cerotic acid; hexahydrobenzoyl bromide; furoic acid; thiophene carboxylic acid; picolinic acid; nicotinic acid; benzoic acid; benzoic acid anhydride; benzoyliodide; benzoyl chloride; toluic acid; xylic acid; toluic acid anhydride; cinnamic acid; cinnamic acid anhydride; aminocinnamic acid; salicylic acid; hydroxytoluic acid; naphthoyl chloride; and naphthoic acid.

It is essential to the present invention, however, that the high molecular weight carboxylic acylating agent and the second carboxylic acylating agent be selected to provide a total number of carbon atoms in the first and second acylating agents which is sufficient to render the dispersant hydrocarbon-soluble. Generally, the sum of the carbon atoms in the two acylating agents will be at least about 40 carbon atoms and more generally will be at least about 175 carbon atoms. Accordingly, if the first carboxylic acylating agent contains a large number of carbon atoms, the second carboxylic acylating agent does not need to contain a large number of carbon atoms, and preferably is a lower molecular weight of mono-carboxylic acid such as isostearic acid.

Isostearic acid, a commercially available mixture of methyl branched $C_{18}$ carboxylic acid and containing minor amounts of other acids impurities, is the preferred second acylating agent. It is also preferred that the commercial isostearic acid not have a lactone content greater than 1.0 weight percent and that the straight chain content (GC area percent analysis) be less than 10 percent and preferably less than 8 percent. In addition, the non-$C_{18}$ acid content, which is comprised mainly of $C_{12}$, $C_{14}$ and $C_{16}$ acids is preferably less than 7 percent. A preferred isostearic acid is PRISORINE®3502 available from Unichema International of 4650 South Racine Avenue, Chicago, Ill. 60609.

Acylation of the polyalkylenepolyamine in the manner disclosed herein results in a variety of acylated polyalkylenepolyamine containing molecular entities. As a result, the polyalkylenepolyamine molecules may not be all acylated with both high molecular weight acylating agent and monocarboxylic acid acylating agent nor are all polyalkylene polyamine molecules acylated to the same extent. A distribution of acylated products is obtained in which the number of amine groups acylated on different amine-containing molecules ranges from zero in the extreme (no acylation) to acylation of all 1° and 2° amines (complete acylation).

Ideally, for the dispersant of this invention, the distribution of acylated products is maintained as narrow as possible. Preferably, all the amine groups should not be acylated (insufficient polarity for function as a dispersant). The other extreme i.e. low acylated molecules relative to the total amine content, will result in too high polarity for satisfactory oil solubility and dispersancy and would also provide a matrix for gel formation in the finished oil.

Generally, the equivalents or molar ratio of acylating agents to amine will be such that, on average, the dispersant molecules will have between 1 and 2 amine groups unreacted to provide polarity. The exact number depends on the ratio of the high molecular weight acylating agent (A) to the second acylating agent (C) and the specific composition of the polyalkylenepolyamine. A molar ratio of acylating agents for instance, to tetraethylene pentamine can range from 1:1 to 5:1 with a ratio of 3:1 to 4.5:1 being preferred.

The equivalent weight of the polyalkylene-polyamine for purposes of acylation is based on the number of primary and secondary amine groups per molecule, and the equivalent weight of these acylating agents is based on the number of carboxy groups per molecule. To illustrate, ethylene diamine has 2 equivalents per mole, and therefore, has an average equivalent weight of ½ its molecular weight and tetraethylene pentamine has 5 equivalents per mole and therefore, has an average equivalent weight of 1/5 of its molecular weight. The monocarboxylic acids have one carboxy group, and therefore the equivalent weight of the monocarboxylic acids is its molecular weight. The succinic and aromatic dicarboxylic acid acylating agents, on the other hand, have two carboxy groups per molecule, and therefore, the equivalent weight of each is one-half its molecular weight. Frequently, the equivalent weight of the polyalkylenepolyamine is determined by its nitrogen content, and the equivalent weight of acylating agents is determined by their acidity or potential acidity as measured by the neutralization or saponification equivalents.

However, many commercially available polyalkyleneamines have some tertiary nitrogen containing groups which will not acylate. For example, commercial tetraethylene pentamine contains about 10 percent alkyl substituted piperazine rings and probably has some tertiary amine groups formed by other branching reactions during the amine synthesis. Thus, the equivalent weight for purposes of acylation calculated from total nitrogen content will be higher that is actually the case.

Equivalent weights of polyalkyleneamines can also be calculated from total amine values measured by titration with hydrochloric acid or preferably perchloric acid. However, the same limitations described above are in effect in that tertiary amine groups will titrate but not acylate.

The dispersant reaction product of the invention is a complex molecule comprising oil soluble non-polar hydrocarbon containing moiety or moieties and polar unreacted amine containing moieties. For example, as discussed above for tetraethylene pantamine, the number of acylated amine groups varies in different molecules from 1 to as high as 5. The lower acylated portion of the molecules can form a matrix for gel in finished oils. This can be further exacerbated if too large a portion of the acylating groups are (1) of low molecular weight (2) are straight-chain and (3 contain undesirable pendant groups such as hydroxyl from lactone impurities in the monocarboxylic acid. Therefore, the tendency to gel formation can be reduced by increasing the average molecular weight of the combined acylating groups and increasing the ratio of acylating groups to available amine groups. However, either of the above can be detrimental if excessive. Increasing use of high molecular weight acylation agents beyond a reasonable amount would reduce the effectiveness of the dispersant in two-cycle oil. Also, increased use of both high and low molecular weight acylating agents again beyond a reasonable amount would also have a detrimental effect by disrupting the hydropholic/hydrophylic balance of the dispersant. A corollery to the above is that the preferred ranges for the ratio of high molecular weight acylating agent to low and both acylating agents to amine must be controlled to provide a dispersant which is balanced in detergency and gel avoidance.

The broad range of acylating groups to amine stated above (molar or equivalent) should leave an average of from 0 percent to 50 wt. percent of the amine groups of the polyamine unreacted. It is preferred, however, to have from 20 to 40 percent of the amine groups that are titratable with hydrochloric acid before acylation still left unreacted after acylation. The most desirable amount left unreacted should be from about 30 to about 40 percent. As use herein, percent unreacted amine is determine by the American Oil Chemists Society (A.O.C.S.) Method Tf 1b-64 incorporated herein by reference. The solvents are modified slightly to facilitate seeing the end points, i.e., 80 percent isopropyl alcohol/water is used for tetraethylenepentamine and 90/10 by volume isopropylalcohol/toluene of the dispersants. The error band for this method is about ±3 percent. Such a product would not only give acceptable gel control even with low ratios of high molecular weight acylating to the mono-acid but should also still have sufficient polarity (unacylated amine groups) to provide acceptable dispersant capability regardless of whether the amine is a primary, secondary or tertiary amine. Products within the higher values of the broader range are more susceptible to the deleterious effects of exposure to water.

The precise composition of the two-cycle oil additive of this invention is not known. The polar portion of the product, however, should be comprised substantially of tertiary amines in heterocyclic rings wherein the ratio of tertiary amine to total amine is about 0.7:1 (as measured by the AOCS method Tf 1b-64) and more desirably, at least 0.85:1. The effectiveness of the additive in providing oil stability is dependant in part on the ratio of the monocarboxylic acid acylating agent to the high molecular weight acylating agent and in part on the ratios of acylating agent to amine. It is also dependent on the reaction conditions under which it is formed.

The temperature and pressure of the final stage of the reaction used to prepare the two-cycle oil additives of this invention is critical to maximizing tertiary amine formation, and generally, reaction temperatures ranging from 120° C. up to the decomposition temperature of any of the reactants or the product and pressures of from 0.1 to 760 mm of Hg absolute can be utilized. Preferably, however, the temperature will be above about 150° C. and more generally from about 150° to about 240° C. The pressures used range generally from about 130 to 760 mm of Hg absolute. The higher the temperature the less need there is to reduce the pressure to eliminate water and form tertiary amines as heterocycles.

The preparation of the nitrogen-containing composition of the invention is conducted by reaction of the high molecular weight acylating agent, the alkylene polyamine and the carboxylic acylating agent preferably by adding the acids to the amine in a "reverse addition" mode i.e. acylating agent to amine.

The mode of addition of the reactants is an important aspect of the invention. The reaction is preferably conducted by the addition of the acid to the amine in the "reverse addition" mode, however, the initial addition of the amine to a portion of the second carboxylic acid acylating agent or a mixture of acylating agents followed by the subsequent addition of the remaining acids or the separate addition of the acids in any order is also acceptable.

As indicated above, the optimum raw material addition sequence is to initially add all of the polyalkylenepolyamine. The order of addition of the carboxylic acylating agent and the high molecular weight acylating agent probably has no significant effect on the final product and they may be added simultaneously. However, the "reverse addition" of acid to amine may be impractical due to mixing limitations in a batch reactor. A modification of the preferred mode comprises initially charging some acid to the reactor. Generally, an amount ranging up to 50 percent by volume of the acid is charged to cover the impellers of the reactor. Preferably, the amount charge should be just sufficient to cover the impellers. Then the amine is charged followed by the remaining acids. The reactor temperature at the initial charge of acids can range from 80° C. to 150° C. and preferably from 110° to 130° C.

The reaction time is dependent upon the size of the charge and the reaction temperature. Generally, after the charging of all the acid to the reactor the reactor temperature is increased to from 140° C. to 160° C. and allowed to soak at reflux generally from about 2 to 4 hours.

It is important that some water be present in the system (produced by acylation) during reflux to maximize the acylation reaction. If water is stripped as produced, the amine/amide groups tend to form heterocycles too soon and this reduces the number of amine groups available for acylation by the acid. Low acid conversion results in an unsatisfactory product would result. Allowing water to remain directs the reaction towards maximizing acylation of the available amine/amide groups of the polyamine.

After reflux, the temperature is then increased to from about 170° C. to 190° C. for a period of time, generally from 3 to 10 hours during which most of the water formed during the acylation reaction is removed and a residual total acid number of below 10 is obtained. A small amount of water remains however, which limits cyclization of amide/amine groups. In the final stage, the reactor temperature is again increased, to further remove water including water eliminated by cyclization, to from about 195° C. to about 240° C. with inert gas purge. Alternatively, vacuum stripping may be used at about 150° to about 195° C. for the time required at a reduced pressure of from about 130 to about 250 mm Hg (absolute) with a inert gas bleed. Either method is directed to achieving a tertiary amine to total amine ratio of about at least 0.7:1 or preferably 0.85:1 to 0.95:1. It is desirous to have a free water level below about 0.2 wt. percent, preferably below 0.05 wt. percent in the final product.

Stripping is conducted as disclosed at a temperature and pressure to cause cyclization of remaining ethyleneamine groups with adjacent amide groups. The effect of this conversion to heterocycles containing tertiary amine groups may be measured by following the increase in the tertiary amine or the reduction in primary and secondary amines. With cyclization, the total titratable amine does not change, since only one of the nitrogen atoms in the heterocyclis rings is titratable with HCl. The ring structures or tertiary amine-containing groups are still polar and provide the hydrophilic moieties of the dispersant molecule.

It was discovered that a more stable product, one which avoids gel formation is achieved by maximizing the conversion of the amine nitrogen to tertiary amines. The reaction process disclosed above is directed to ultimately decreasing the primary and secondary amine content and increasing the tertiary amine content of the reaction product to the range specified above.

Compositions comprised of a major amount of two-cycle oil and a minor amount of additive is within the scope of the invention claimed. The additive should be present in the two-cycle oil at a level of from 3 to 20 percent by volume of the composition and preferably from 7 to 15 percent by volume of the composition.

Other additives may be added to the product of the invention claimed to impart other desirable properties thereto. For example, there may be added anti-oxidants, pour point depressants, V.I. improvers, thickeners, thinners, anti-rusts, anti-wear.

In a first optional embodiment of the invention, the 2-cycle additive composition containing the product of this invention can also comprise a polyolefin thickener having a molecular weight ($\overline{Mn}$) ranging from about 800 to about 3000 and preferable from about 900 to about 1500. The polyolefin can be present in the two-cycle composition in amounts ranging from about 1 to about 20 percent by volume of the composition and preferably from about 4 to about 10 percent by volume of the composition. Suitable polyolefins comprise polyolefins derived from $C_2$ to $C_{12}$ olefins such as polybutene, poly-1-octene, poly-1-decene, poly-1-dodecene; copolymers of ethylene with propylene, butene, pentene or hexene, and terpolymers prepared from said lower olefins. Polyolefins are used as thickeners and also enhance the wear protection properties of the oil.

As a second optional embodiment the additive composition can comprise at least one pour point depressant selected from the group consisting of polyalkylacrylates, polyalkylmethacrylates, alkyl-fumarate/vinyl acetate copolymers, etc.

Pour point depressants are used to modify the flow properties of the base oil so as to lower its pour point. The temperature at which the two-cycle oil composition of the invention ceases to flow or pour is termed its pour point. It is important that two-cycle oil compositions be capable of flowing freely from reservoirs and through oil lines and filters making up part of the injection lubricating system common in modern two-cycle engines at low temperatures in order to insure proper functioning of the lubricant composition in the engine.

Some pour depressants can also modify linear alkyl side chains when they are present in small quantities in the additive of the invention, thereby further reducing the tendancy for floc and gel formation.

Preferably, the pour point depressant of the two-cycle oil composition is a $C_8$ to $C_{18}$ dialkyl fumarate-vinyl acetate copolymer due to its ability to modify wax in both high and low viscosity base oils. Products with high concentrations of $C_{14}$ and $C_{16}$ alkyl group are favored for floc and gel control.

The amount of the pour point depressant present in the two-cycle oil composition can range from about 0.1 to about 1.0 wt. percent, preferably from about 0.2 to 0.7 wt. percent. The instant invention contemplates a composition comprising the nitrogen-containing 2-cycle oil additive of the invention used in combination with at least one polyolefin and/or at least one pour point depressant.

The dispersants of the present invention can be incorporated into a lubricating oil in any convenient way. Thus, the compounds or mixtures thereof, can be added directly to the oil by dissolving the same in the oil at the desired level or concentration for the dispersant. Alternatively, the dispersant can be blended with a suitable oil soluble solvent such as mineral spirits and/or base oil to form a concentrate and then the concentrate may be blended with lubricating oil to obtain the final formulation. Such dispersant concentrates will typically contain (on an active ingredient (A.I.) basis) from about 10% to about 95 wt. percent, and preferably from about 20 to about 70 wt. percent dispersant additive, and typically from about 0% to about 95 wt. percent, preferably from about 5 to about 80 wt. percent base oil based on the weight of the concentrate. The concentrate can also comprise from 0-80 wt. %, typically from 10 to 60 weight % solvent.

The invention is more fully delineated in the following Examples.

EXAMPLE 1

Emersol ®871 iso-stearic acid (ISA) (44.3 g;0.14 mole based on a molecular weight of 312 from the Total Acid Number of 180) was placed in a 250 ml three-neck flask fitted with a magnetic stirrer, heating mantel, thermocouple and reflux condencer. The temperature was increased to about 70° C. Union Carbide technical grade tetraethylenepentamine (TEPA) (18.9 g;0.084 mole based on a molecular weight of 224 from a Total Amine Value of 1250) was added from a beaker with good stirring followed by an additional 44.2 g (0.14 mole) of iso-stearic acid. The temperature increased to about 130° C. from the heat of salt formation. The heating mantel was used to take the temperature to 150° C.

where it was held for three hours. As the acylation reaction progressed water was generated. It was retained in the system by the reflux condencer. After the three hours at 150° C., a Deane-Stark trap was placed between the condenser and the flask and the temperature increased to 180° C. Most, but not all of the water in the system was removed by the trap while the reaction was continued at 180° C. for four hours. The temperature was then reduced to 150° C. The trap/condencer was removed and the flask fitted with a $N_2$ bleed and a vacuum tube adapter. House vacuum was applied (about 10 mm of Hg Absolute) and $N_2$ introduced through a tube extending below the liquid surface at a rate giving a fine stream of bubbles. The upper portion of the flask was insulated with fiber glass wool and vacuum stripping to remove water was carried out for one hour. Heating was then stopped and the vacuum released. The product was cooled to 100° C. under a $N_2$ blanket and then transferred to a glass storage container.

The residual Total Acid Number of the product was 8.0 (by ASTM method D.974-85 incorporated herein by reference, but using phenol phthaline as the indicator) and the Total Amine Value 85 (by A.O.C.S. method Tf lb- 64) as mg KOH/g.

EXAMPLE 2

Iso-stearic acid (ISA) (as in the previous Example - 84.8 g; 0.272 moles) was mixed with a solution of polyisobutenyl-succinic anhydride (PIBSA) (15.6 g;0.013 moles) in mineral oil (Solvent 150 N; 3.9 g). One half of the mixture was added to a reaction flask of the type described in Example 1 . Tetraethylenepentamine (TEPA) (18.9 g; 0.084 mole) was then added with stirring followed by the other half of the acid/anhydride mixture described above. The temperature was increased to 150° C. and the procedure of Example 1 followed to complete the acylation reaction and remove water.

The final product had a residual Total Acid Number of 5.6 mg KOH/g and a Total Amine Value of 87 mg KOH/g.

EXAMPLE 3

Iso-Stearic acid (as in Example 2), 81.1 g; 0.26 mole) and polyisobutenylsuccinic anhydride (25.0 g; 0.25 mole) were added to a reaction flask of the type described in Example 1. The temperature was increased to 50° C. with stirring. Tetraethylenepentamine (as in Example 1, 18.9 g; 0.084 mole) was added over a period of 10 minutes. The temperature rose to about 120° C. during this addition. Additional heat was applied and the temperature raised to 150° C. where, as in Example 1, it was held for three hours.

The procedure of Example 1 was followed to complete the acylation and remove water with the exception that the vacuum stripping time was 0.5 hours. The final product had a Total Acid Number of 6.0 mg KOH/g and a Total Amine Value of 68.3 mg KOH/g.

EXAMPLE 4

Iso-stearic acid (as in Example 1) (73.8 g; 0.24 moles) and polysobutenylsuccinic anhydride (as in Example 2) (50.0 g; 0.05 mole) were premixed, warmed to 80° C. and added to a reaction flask of the type described in Example 1 but of 500 ml rather than 250 ml capacity. Mixing was initiated and the temperature stabilized at 80° C. Tetraethylenepentamine (as in Example 1) (18.9 g; 0.084 mole) was added with stirring over a period of 10 minutes. The temperature rose to 120° C. Heat was applied to bring the temperature to 150° C. where it was held for three hours. As in Example 1, a Deane-Stark trap was inserted below the reflux condenser and the temperature was increased to 180° C. where it was held for four years. The reaction mixture was then cooled to 150° C. The Deane-Stark trap was removed and polyisobutylsuccinic anhydride (50 g; 0.05 mole) was added to the flask. Heating was continued at 150° C. for one hour with a $N_2$ purge through a bubbler below the surface to prevent oxidation and assist water removal. The product was then vacuum stripped as described in Example 1 to complete the reaction and remove the last of the water.

The product had a residual Total Acid Number of 4.3 mg KOH/g and a Total Amine Value of 60.3 mg KOH/g.

EXAMPLE 5

Iso-stearic acid (as in Example 1, 73.8 g; 0.24 mole) was added to a reaction flask of the type described in Example 1 but of 500 ml capacity. Heat was applied to bring the temperature of 50° C. Tetraethylenepentamine (18.9 g; 0.084 mole) was added with stirring over a period of 10 minutes. The temperature rose to 120° C. Heat was applied to bring the temperature to 150° C. where it was held for three hours. As in Example 1, a Dean-Stark trap was inserted below the reflux condenser and the temperature increased to 180° C. where it was held for four hours. The reaction mixture was then cooled to 150° C. The Dean-Stark trap was removed and polyisobutyl succinic anhydride (50 g; 0.05 mole) was added to the flask. Heating was continued at 150° C. for one hour with a $N_2$ purge through a bubbler below the surface to prevent oxidation and assist water removal. The product was then vacuum stripped as described in Example 1 to complete the reaction and remove the last of the water for 0.5 hours at 150° C.

The product had a residual Total Acid Number of 4.3 mg KOH/g and a Total Amine Value of 60.3 mg KOH/g.

EXAMPLE 6

Iso-stearic acid (as in Example 1, 59.0 g; 0.19 moles) was added to a 500 ml flask of the type described in Example 1. Tetraethylenepentamine (18.9 g; 0.084 mole) (as in Example 2) was added with stirring over a period of about 12 minutes. The temperature increased to 30° C. Heat was applied to increase the temperature to 150° C. The reaction was continued and completed as described in Examples 5 except that the amount of polyisobutenyl-succinic anhydride was 100 g (0.10 mole) and the vacuum stripping was for 0.25 hours at 150° C.

The residual Total Acid Number of the product was 6.8 mg KOH/g while the Total Amine Value was 40.6 mg KOH/g.

EXAMPLE 7

Unichema Prisorine ®3502 iso-stearic acid (88.5 g; 0.3 mole based on a molecular weight of 295 from the Total Acid Number of 190) was placed in a 250 ml three neck flask fitted in the same way as that described in Example 1. Heat was applied to bring the temperature to 50° C. and tetraethylenepentamine (Union Carbide "Ultra High Purity" grade, 18.9 gm; 0.084 mole based on a molecular weight of 224 from a Total Amine Value of 1250) was added with stirring over a period of 10 minutes. The temperature increased to 110° C. from the heat of reaction. Heat was applied to bring the temperature to 150° C. and it was maintained there for three hours. Thereafter the product was treated as in Example 1 with the exception that the vacuum stripping was conducted at 120° C. rather than 150° C.

The product had a residual Total Acid Number of 8.2 and a Total Amine Value of 85.7.

EXAMPLE 8

Iso-stearic acid (as in Example 7, 84.8 g; 0.29 moles) and an 80/20 mixture by weight of polyisobutyl-enyl-succinic anhydride and solvent 150 N mineral oil (15.6 ; 12.5 g of anhydride; 0.013 mole) were placed in a 250 ml three neck flask fitted in the same way as that described in Example 1. Heat was applied to bring the temperature to 130° C. Tetraethylenepentamine (as in Example 7, 18.9 g; 0.084 mole) was added with stirring. The temperature increased to 140° C. from the heat of reaction. Heat was applied to bring the temperature to 150° C. where it was held for three hours. Thereafter the product was treated as described in Example 1 with the exception that the vacuum stripping was conducted at 120° C. rather than 150° C.

The product had a residual Total Acid Number of 7.7 and a total Amine Value of 69.4.

EXAMPLE 9

Iso-steric acid (as in Example 7, 84.8 g; 0.29 moles) was placed in a 250 ml three neck flask fitted in the same way as that described in Example 1. Heat was applied to bring the temperature to 140° C. and tetraethylenepentamine (as in Example 7, 18.9 g; 0.084 mole) was added with stirring. The temperature increased to 150° C. from the heat of reaction and it was maintained there for three hours. A Dean-Stark trap was then inserted below the condenser and the temperature was increased to 180° C. for three hours. At that time, the temperature controller was reset for 150° C. and an 80/20 mixture by weight of polyisobutenylsuccinic anhydride and solvent 150 N mineral oil (15.6 g; 12..5 g of anyhdride;0.013 mole) was added rapidly as the temperature went down. The temperature was maintained at 150° C. for one hour from the time the anhydride addition was complete.

The temperature was then reduced to 120° C. and the product vacuum stripped as described in Example 1.

The Total Acid Number of the product was 5.9 and the Total Amine Value was 69.2.

EXAMPLE 10 and 11

The products made in Examples 1-6 were used as dispersants in two oil blends. The oils in two oz. glass vials ¾ full were placed in a refrigerator at from 0° to 5° C. and the approximate number of days required for the formation of gel was established by periodic examination. The results are shown in Tables 1 and 2.

| The formulation used for Examples 1-9 | |
|---|---|
| | Vol. % |
| Exxon 150 Solvent Neutral (Base oil) | 6.00 |
| Exxon 600 Solvent (Base oil) | 49.66 |
| Exxon 2507 Bright Stock | 14.80 |
| Pour Point depressant | 0.20 |
| Rust Inhibitor | 0.65 |
| Dispersant of Invention | 8.69 |
| Exxon Varsol ® (mineral spirits) | 20.00 |
| | 100.00 |

The oils were blended for one hour at room or ambient temperature.

It is evident from Table 1 and 2 that the inclusion of a high molecular weight acylating agent and the increase in the stripping temperature and the use of a reverse addition mode all contributed to increasing the stability of products in terms of gel formation of the present invention.

The following formulations were used to prepare the compositions of the invention for cold storage testing of Examples 12-21. The results are shown in Table 3.

| Formulation I | |
|---|---|
| CWO - Esso Petroleum Canada light Naphthenic base oil | 75.2 |
| Petrolube 150 ® = non-distilled heavy base oil (Quaker State) | 15.0 |
| Dispersant of Invention | 9.3 |
| Antioxidant | 0.5 |
| | 100.0 |

TABLE 1

| | Example 1 | Example 2 | Example 3 | Example 4 | Example 5 | Example 6 |
|---|---|---|---|---|---|---|
| PIBSA/ISA/TEPA mole ratio | —/3.36/1.00 | 0.148/3.22/1.00 | 0.296/3.08/1.00 | 0.592/2.80/1.00 | 0.592/2.80/1.00 | 1.185/2.24/1.00 |
| REACTION CONDITIONS | | | | | | |
| ADDITION ORNER | MODIFIED | MODIFIED | TEPA TO ISA PIBSA TO ABOVE | TEPA TO MIXED ACIDS | ← Same as Ex. 4 | TEPA TO ISA PIBSA TO ABOVE |
| STRIPPING TEMP., °C. | 150 | 150 | 150 | 150 | ← | 150 |
| TOTAL AMINE NO | 85 | 87 | 68 | 60 | 60 | 41 |
| TERT-AMINE NO | — | — | 44 | — | — | — |
| TOTAL ACID NO | 8.0 | 5.6 | 6.0 | 5.4 | 4.3 | 6.8 |
| BLENDED OIL (0° C. STORAGE) | | | | | | |
| DAYS TO GEL | 47 | 91 | 210 | >508 | 381 | >545 |

MW used in calculations
ISA = 312 (EMERY Industries Inc. - EMERSOL ® 871)
TEPA = 224 (Union Carbide UHP Grade)
PIBSA = 1000 (Exxon Chemical PIBSA 112)

TABLE 2

| | Example 7 | Example 8 | Example 9 |
|---|---|---|---|
| PIBSA/ISA/TEPA mole ratio | —/3.55/1.00 | 0.148/3.41/1.00 | 0.148/3.41/1.00 |
| REACTION CONDITIONS | | | |
| ADDITION ORDER | FORWARD | FORWARD MIXED | FORWARD ISA FIRST |

TABLE 2-continued

|  | Example 7 | Example 8 | Example 9 |
|---|---|---|---|
|  |  | ACIDS |  |
| STRIPPING TEMP., °C. | 120 | 120 | 120 |
| TOTAL AMINE NO | 86 | 69 | 69 |
| TERT-AMINE NO | 44 | — | — |
| TOTAL ACID NO | 8.2 | 7.7 | 5.9 |
| BLENDED OIL (0° C. STORAGE) |  |  |  |
| DAYS TO GEL | 13 | 76 | 49 | molecular weight used in calculations
ISA - mw = 295 (PRISORINE ® 3502)
PIBSA - mw = 1000 (Exxon Chemical PIBSA 112)
TEPA - mw = 224 (Union Carbide UHP grade)

TABLE 3

|  | PARTS BY WEIGHT | | | MOLE RATIOS (1) MOLE RATIOS (1) | VAC | STRIP | AMINE VALUES | | | DAYS TO | FORMU- |
|---|---|---|---|---|---|---|---|---|---|---|---|
|  | ISA | PIBSA | TEPA | ISA/PIBSA/TEPA | NRS | TEMP. | TO-TAL | TERT. | RA-TIO | GEL IN | LATIONS |
| Example 12 A/B | 202.8 | 60 | 47.2 | 3.26/0.28/1.0 | 0.5 | 180 | 73.6 | 50.4 | 0.68 | 103 |  |
|  |  |  |  |  | 2 | 180 | 74.3 | 58.3 | 0.78 | >11 months |  |
| Example 13 A/B | 1014 | 300 | 236 | 3.26/0.28/1.0 | 1.5 | 180 | 63.0 | 45.7 | 0.73 | 93 |  |
| Example 14 | 86.3 | 26.6 | 18.9 | 3.28/0.32/1.0 | 1.5 | 180 | 59.9 | 42.7 | .71 | 103 |  |
| Example 15 A/B | 88.6 | 26.2 | 18.9 | 3.56/0.31/1.0 | 1 | 193 | 51.1 | 47.0 | 0.93 | >8 months |  |
| Example 16 A/B | 1217 | 360 | 283.2 | 3.26/0.285/1.0 | 2 | 180 | 67.8 | 48.0 | .71 | 157 |  |
|  | 1243 | 367.7 | 283.2 | 3.33/0.29/1.0 | 2 |  | 66.0 | 49.8 | .75 |  |  |
| Example 17 | 81.2 | 24.0 | 18.9 | 3.26/0.28/1.0 | 1 | 180 | 66.2 | 46.1 | .70 | 119 |  |
| Example 18 A/B | 283 | 83.6 | 66 | 3.25/0.28/1.00 | 3 | 150 | 70.9 | 49.9 | 0.70 | — | 79 |
| Example 19 A/B | 388.7 | 114.9 | 87.5 | 3.37/0.29/1.00 | 3 | 170 | 62.9 | 52.1 | 0.83 | >8 months | 92 |
| Example 20 A/B | 568.4 | 168.0 | 127.9 | 3.37/0.29/1.00 | 4 | 180 | 63.1 | 55.4 | 0.88 | >8 months | — |
| Example 21 A/B | 285.2 | 193.4 | 73.1 | 2.97/0.59/1.00 | 5 | 180 | 58.2 | 51.0 | 0.88 | >8 months |  |

(1) Molecular weights based on acid and amine values
PIBSA = 1000
PRISORINE ® 3502 (ISA) (Unichema) = 295
Emersol 871 (ISA) (Emery) = 312
TEPA (Union Carbide) - 224

| Formulation II |  |
|---|---|
| MCT 30 - Solvent extracted & dewaxed Neutral base oil (Esso Petroleum Canada) | 52.4 |
| Petrolube ® 150 | 12.0 |
| Additive | 8.3 |
| Varsol 3139 - (Petroleum Solvent BP - 310 and 390° F.) | 27.0 |
| AC 154 C (Rohm & Haas polyalkylmethacrylate pour depressant) | 0.3 |
|  | 100.00 |

| Formulation III |  |
|---|---|
| CWO | 81.1 |
| Parapol 950 (Exxon Chemical - polyiso-butylene) | 6.51 |
| AC 154 C (pour depressant) | 0.29 |
| Antioxidant | 0.5 |
| Dispersant of the Invention | 11.5 |
| Rexol 25/6 (antirust, antioxident) | 0.2 |
|  | 100.00 |

| Formulation IV |  |
|---|---|
| CWO | 81.3 |
| Parapol 950 (polyisobutylene) | 6.5 |
| AC 154 C (pour depressant) | 0.2 |
| Additive | 11.5 |
| ECA 1391 | 0.5 |
|  | 100.00 |

Examples 12-21 were prepared in accordance with the invention with variations in stripping time and temperature to show the effect of these variations on gel formation. The results obtained show that increasing stripping time and temperature resulted in increasing product stability (less gel) over time.

We claim:

1. A two-cycle oil additive comprising the reaction product of (A) a high molecular weight carboxylic acylating agent (B) a polyalkylenopoly amine and (C) a monocarboxylic acid acylating agent, wherein the molar ratio of the monocarboxylic acid acylating agent to the high molecular weight acylating agent is at least 3:1 and wherein the tertiary amine to total amine ratio is at least 0.7:1.

2. The two-cycle oil additive in claim 1, wherein the high molecular weight acylating agent has a molecular weight ($\overline{Mn}$) ranging from 700 to 4,000.

3. The two-cycle oil additive in claim 2, wherein the acylating agent is an aliphatically substituted succinic anhydride.

4. The two-cycle oil additive of claim 3, wherein the acylating agent is a polyisobutylene and/or polyisobutane succinic anhydride.

5. The two-cycle oil additive of claim 4, wherein the polyisobutylene or polyisobutane substituent of the acylating agent has a molecular weight (e,ovs/Mn/ ) ranging from 900 to 2,500.

6. The two-cycle oil additive of claim 1, wherein the monocarboxylic acid acylating agent is isostearic acid.

7. The two-cycle oil additive of claim 1, wherein the polyalkylenepolyamine has the formula:

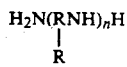

wherein R is $C_2$ to $C_3$ alkylene radical, $R^1$ can be hydrogen or an alkyl radical of from about 1 to about 16 carbon atoms.

8. The two-cycle oil additive of claim 7, wherein the polyamine is tetraethylene pentamine.

9. The two-cycle oil additive of any of the preceeding claims wherein the ratio of the ratio acylating agents to polyalkylene amine is from 3.5:1 to 4.5:1.

10. The two-cycle oil additive of claim 1, wherein the molar ratio of monocarboxylic acid acylating agent to high molecular weight acylating agent ranges from about 5:1 to about 59:1.

11. The two-cycle oil additive of claim 10, wherein the molar ratio of monocarboxylic acids acylating agent to high molecular weight acylating agent ranges from about 5:1 to 12:1.

12. The two-cycle oil additive of claim 1 wherein the monocarboxylic acid acylating agent has a carbon atom range of from about 10 to about 30.

13. The two-cycle oil additive of claim 12, wherein the monocarboxylic acid is isostearic acid.

14. A two-cycle oil additive composition comprising a major proportion of two-cycle oil and a minor amount of a two-cycle oil additive derived from the reaction of a high molecular weight aylating agent, a monocarboxylic acid second acylating agent and a polyalkylenepolyamine, wherein the molar ratio of monocarboxylic acid acylating agent to high molecular weight acylating agent is at least 3:1 and wherein the tertiary amine to total amine ratio for the product is at least 0.7:1.

15. The two-cycle oil composition of claim 14, wherein the high molecular weight acylating agent is a polyisobutylene succinic anhydride.

16. The two-cycle oil composition of claim 14, wherein the polyamine is tetraethylene pentamine.

17. The two-cycle oil additive composition of claim 14, wherein the monocarboxylic acid acylating agent is isostearic acid.

18. The two-cycle oil additive composition of claim 14, wherein the additive is present in an amount of from about 3 wt. percent to about 20 wt. percent based on the weight of the composition.

19. The two-cycle oil additive composition of claim 18, wherein the additive is present in an amount of from about 3wt. percent to about 15 wt. percent.

20. The two-cycle oil composition of claim 14, further comprising at least one polyolefin derived from $C_2$ to $C_{12}$ olefins.

21. The two-cycle oil composition of claim 20, wherein the polyolefin is a copolymer obtained from the polymerization of olefins selected from $C_2$ to $C_{12}$ olefins.

22. The two-cycle composition of claim 20, wherein the polyolefin is a terpolymer derived from the polymerization of olefins selected from $C_2$ to $C_{12}$ olefins.

23. The two-cycle oil additive of claim 20, wherein the polyolefin is a polybutene.

24. The two-cycle oil composition of claim 14 further comprising a pour point depressant selected from the group consisting of polyalkylacrylates; polyalkylmethacrylates; alkyl-fumarate-vinyl acetate copolymers.

25. The two-cycle oil composition of claim 24, wherein the pour point depressant is a $C_8$–$C_{18}$ dialkyl fumarate-vinyl acetate copolymer.

26. A process for preparing a two-cycle oil additive comprising the steps of:

A. Charging to a heated and stirred reactor containing from 0° to 50° percent by volume of the total charge, at least one acylating agent or mixed acylating agents and at least one polyalkylene polyamine, B. Charging to the reactor the remaining acylating agents;

C. Refluxing at a temperature and for sufficient time to maximize amide/amine acylation in the presence of water;

D. Distilling at a temperature necessary to substantially remove water and to an acid number of less than about 10.

E. Stripping at temperatures of from about 150° C. to about 240° C. to obtain a total acid number of less than 10 and a tertiary amine to total amine ratio of at least 0.7:1.

27. The process of claim 26, wherein the reactor at the initial charge of acylating agents is heated to from 80° C. to 150° C.

28. The process of claim 26, wherein the reflux is conducted under an inert gas blanket.

29. The process of claim 28, wherein the inert gas is nitrogen.

30. The process of claim 26, wherein reflux is conducted at a temperature of from about 140° C. to 160° C.

31. The process of claim 26, wherein distillation is conducted at a temperature of from about 170° to 190° C.

32. The process of claim 26, wherein the stripping is conducted under pressure from 0.1 to 760 mm of Hg absolute and a temperature of from about 150° C. to about 190° C.

33. The process of claim 26, wherein the stripping is conducted at temperatures of about 195° C. to about 240° at atmospheric pressure with under an inert gas blanket.

34. The process of claim 26, wherein the acylating agents are polyisobutylene succinic anhydride and isostearic acid.

35. The process of claim 26, wherein the polyalkyleneamine is tetraethylene pentamine.

36. The process of claim 27, wherein the ratio of isostearic acid to polyisobutylene succinic acid is at least 3:1.

37. The process of claim 27, wherein the ratio of isostearic acid to polyisobutylene succinic acid is at least 5:1.

38. A two-cycle oil concentrate composition for formulating two-cycle oil compositions comprising from about 5% to about 80% by weight of a substantially inert organic solvent/diluent and from about 10% to about 95% by weight of a two-cycle oil additive as described in claim 1.

* * * * *

UNITED STATES PATENT AND TRADEMARK OFFICE
CERTIFICATE OF CORRECTION

PATENT NO. : 5,221,491
DATED : June 22, 1993
INVENTOR(S) : Renee M. Roper, et. al.

It is certified that error appears in the above-indentified patent and that said Letters Patent is hereby corrected as shown below:

Column 20, line 63, Claim 5. Please delete the words "(e,ovs/Mn/)" and insert in place thereof -- ($\overline{M}n$) --.

Signed and Sealed this

Twenty-eighth Day of June, 1994

Attest:

BRUCE LEHMAN

Attesting Officer    Commissioner of Patents and Trademarks